April 10, 1951 A. MOLISKEY 2,548,038
FLUID PRESSURE ACTUATED LIFTING APPARATUS
Filed Oct. 24, 1947 3 Sheets-Sheet 1
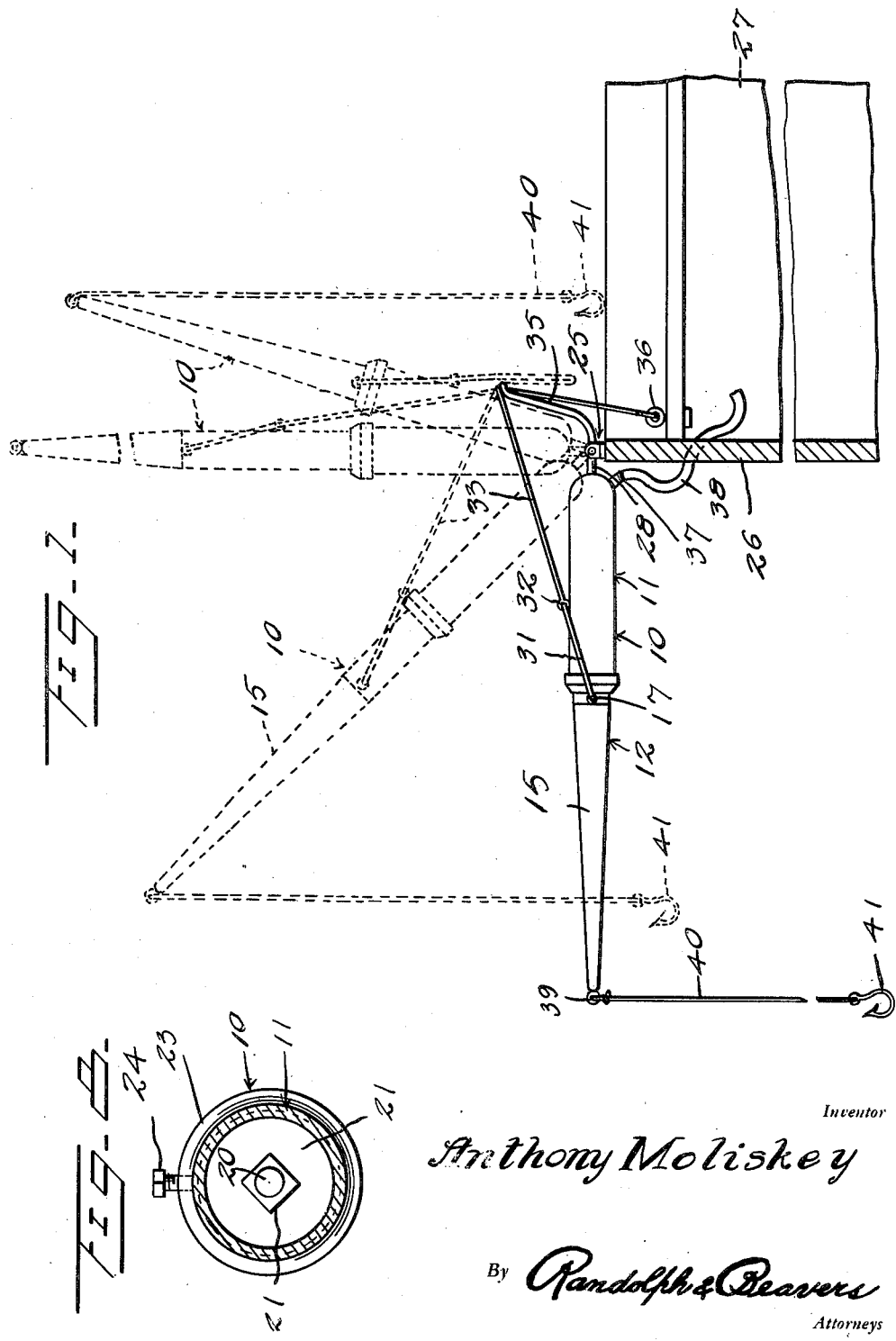
Inventor
Anthony Moliskey
By Randolph & Beavers
Attorneys

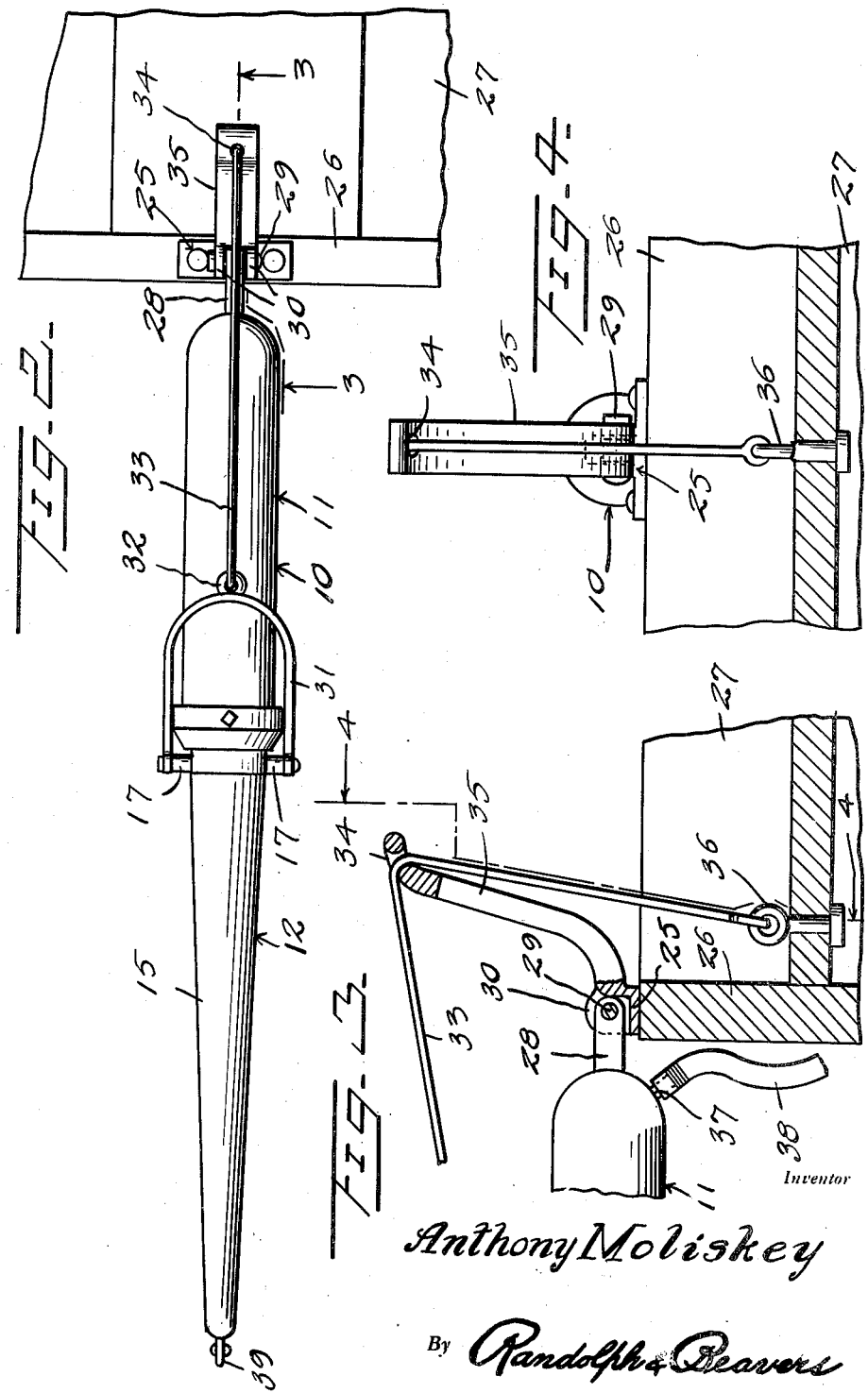

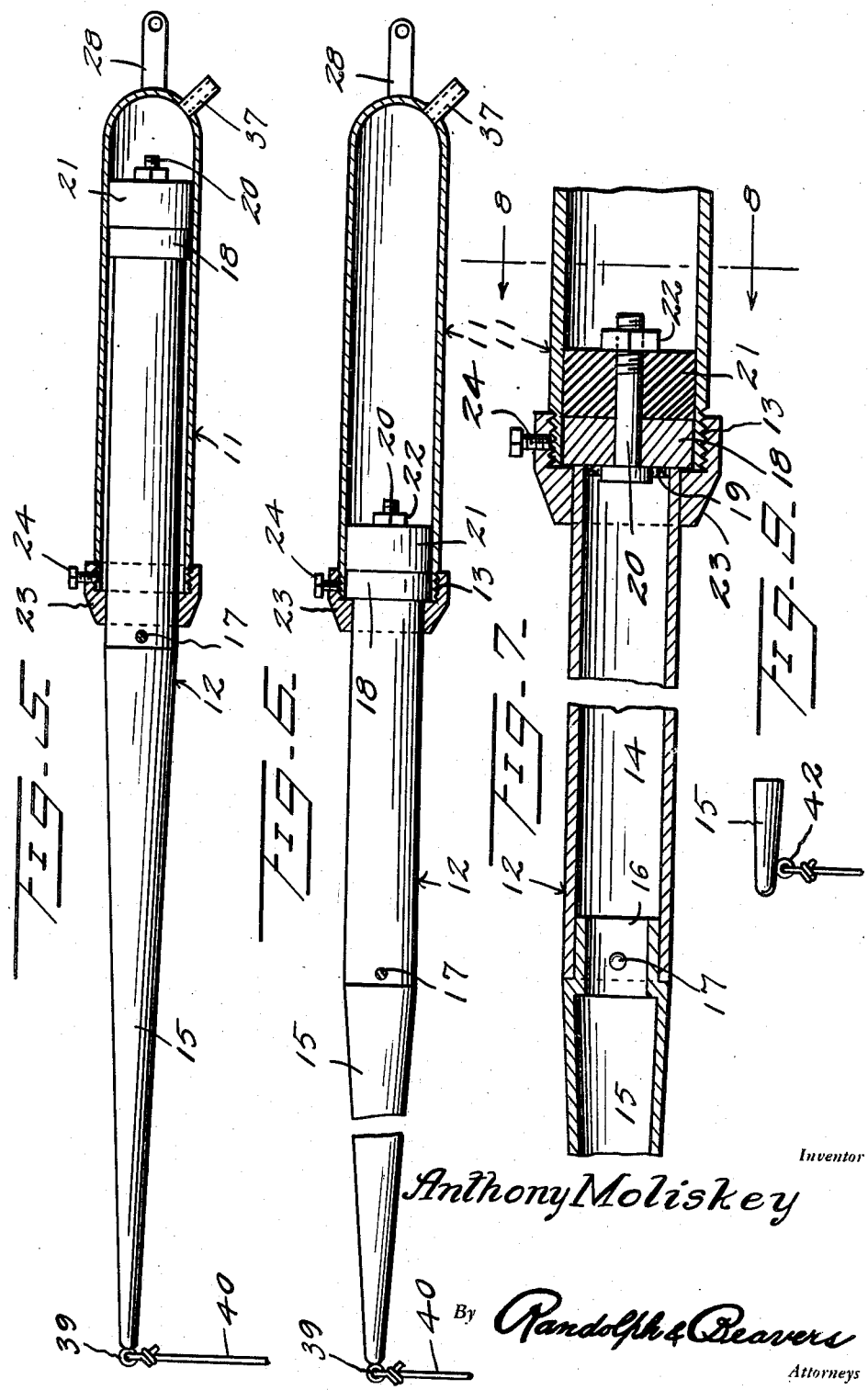

Patented Apr. 10, 1951

2,548,038

UNITED STATES PATENT OFFICE 2,548,038

FLUID PRESSURE ACTUATED LIFTING APPARATUS

Anthony Moliskey, San Pedro, Calif., assignor to Leona N. Moliskey and Paul Major Application October 24, 1947, Serial No. 781,993

1 Claim. (Cl. 212—8)

This invention relates to a lifting apparatus especially adaptable for use as a fishing pole in connection with commercial fishing for large game fish such as tuna, sea bass and albacore and is particularly adaptable for use with such fish which weigh in excess of one hundred and fifty pounds and which can not be landed or brought to gaff by fishermen with rod and reel, without danger of injury to the fishermen and which, in the past, has frequently required as many as four men to boat such a fish.

More particularly, it is an aim of the present invention to provide a fishing pole formed of telescoping sections which are adapted to be extended by a pressure medium and which is provided with means causing the pole to be swung upwardly and inwardly over the boat, to which it is connected, when pressure is applied to the pole, so that a fish, hooked to a line connected to the pole will be raised out of the water thereby and swung into the boat without the necessity of gaffing and in such a manner as to substantially eliminate the danger of the fish striking the boat and becoming unhooked.

More particularly, it is an object of the present invention to provide a pressure actuated apparatus for hoisting and swinging a load and which is readily adaptable for use as a derrick or boom and which is capable of being made in various sizes for accommodating various loads.

Various other objects and advantages of the invention will hereinafter become more fully apparent from the following description of the drawings, illustrating a presently preferred embodiment thereof, and wherein:

Figure 1 shows the invention in side elevation in a preferred application and use thereof as a fishing pole;

Figure 2 is an enlarged top plan view thereof;

Figure 3 is a vertical sectional view taken substantially along a plane as indicated by the line 3—3 of Figure 2;

Figure 4 is a sectional view taken substantially along a plane as indicated by the line 4—4 of Figure 3 and showing the apparatus in end elevation and looking toward the inner end thereof;

Figure 5 is a longitudinal sectional view, partly in side elevation and showing the pole in a retracted position;

Figure 6 is a view similar to Figure 5 and showing the pole in an extended position;

Figure 7 is a fragmentary longitudinal, central sectional view of the intermediate portion of the pole;

Figure 8 is a cross sectional view of the pole taken substantially along a plane as indicated by the line 8—8 of Figure 7, and Figure 9 is a side elevational view showing a slight modification of the tip of the pole.

Referring more specifically to the drawings, a novel fishing pole or lifting apparatus, designated generally 10 and comprising the invention, includes an elongated pole preferably formed of tubular telescoping sections 11 and 12, as best seen in Figures 5, 6 and 7.

The inner pole section 11 is closed at its inner end and is provided with an open, externally threaded outer end 13. The outer pole section 12 preferably includes an inner tubular portion 14 of substantially uniform diameter throughout its length and of a small external diameter than the internal diameter of the pole section 11, and an elongated, tapered tip 15 which is likewise preferably hollow and closed at its outer end and which preferably has a restricted nipple 16 at its inner end which extends into the outer end of the tubular portion 14 and is secured thereto by suitable fastenings 17. The inner end of the tubular portion 14 has a disc 18 secured thereto in any suitable manner as by welding at 19 and which forms the headed inner end of the outer pole section 12 and is sized to reciprocally engage in the inner section 11. A bolt 20 extends through the central portion of the head 18 and through a central bore of a relatively thick disc of rubber or other suitable material 21 which is clamped against the exposed side of the head 18 by a nut 22 which engages a threaded shank end of the bolt 20. The rubber disc 21 is likewise adapted to slideably engage closely within the bore of the inner pole section 11 and forms a sealing member, for a purpse which will hereinafter become apparent. A retaining collar 23 is rotatably disposed on the tubular element 14 and is provided with an enlarged internally threaded end which threadedly engages the threaded end 13 of the pole section 11 and is retained thereon by a setscrew 24 which extends radially through the threaded portion of the collar 23 and into engagement with the threaded end 13. The head 18 is larger in diameter than the bore portion of the collar 23 which slideably engages the tubular element 14 so that collar functions as a stop to limit the outward telescoping movement of the pole section 12 relatively to the pole section 11, as indicated in Figures 6 and 7.

As best seen in Figures 2, 3 and 4, a mounting bracket 25 is adapted to be fastened to the gunwale 26 of a boat 27, which is partially illustrated, and said bracket 25 is provided with spaced upstanding apertured ears for receiving therebetween an apertured extension 28 which is formed integral with or suitably secured to the inner closed end of the pole section 11 and which is connected to the bracket 25 by pivot pin 29 which extends through the aperture of said extension or arm 28 and through the apertured ears 30 for pivotally or swingably mounting the fishing pole 10 on the gunwale 26.

The fastening 17 projects at both ends from the pole section 12 for pivotally mounting the ends of a U-shaped yoke 31 which is provided with an outwardly projecting eye 32, intermediate of its ends, to which is anchored one end of a flexible hoisting element 33 which extends inwardly therefrom through an eye 34 of an arm 35 which extends inwardly and upwardly from the mounting 25 as best illustrated in Figures 3 and 4 and which is preferably formed integral with the mounting 25 but which could form an extension of the rod arm 28 and in which case it would swing therewith rather than being fixedly supported relatively to the gunwale 26 with the mounting 25. The flexible member 33 after passing through the eye 34 extends downwardly and has its opposite end anchored to any suitable part of the boat 27, as by means of the eye bolt 36 but preferably beneath and adjacent the mounting 25.

The pole section 11 adjacent its inner or closed end is provided with a nipple 37 to which a hose or flexible conduit 38 is connected. The hose 38 extends therefrom and is connected at its opposite end, not shown, to a suitable source of a compressed pneumatic or hydraulic medium, not shown. The outer end of the tip portion 15 of the pole is preferably provided with an outwardly projecting eye 39 to which a fishing line 40 is adapted to be attached, as by means of a snap fastening, or by being tied directly thereto, and the opposite free end of the line 40 is attached to a fish hook 41. If desired, and as illustrated in Figure 9, the tip 15 can be provided with an eye 42 located on its under side and adjacent its outer end in lieu of and for the same purpose as the eye 39 or it will be readily apparent that the fishing line 40 could be passed through guides along the upper side of the rod 10 and attached to a reel or winch by means of which the line could be payed out or wound in relatively to the fishing rod, if desired.

From the foregoing it will be readily apparent that the fishing rod 10 will normally be supported in its full line position of Figure 1 by the flexible member 33 and with the pole section 12 fully retracted. Thus disposed, the line 40 is adapted to be of sufficient length so that the hook 41 and bait, not shown, which it may carry will be trailing in the water. When a fish is caught on the hook 41 the operator of the rod 10 by admitting the compressed medium, such as compressed air from a storage tank within the boat to the hose 38 will cause the rod section 11 to be filled with the compressed air behind the piston or seal 21 and the pressure of this air or other compressed medium, which can equally well be an hydraulic fluid, will cause the rod section 12 to be projected outwardly of the section 11 for extending the rod. This extension of the rod 10, which will be gradual, will also cause the rod to swing upwardly in order to take care of the fact that the cable or flexible member 33 is not extensible so that in order to permit extension of the rod said rod must swing on its pivot 29 to enable the eye 32 of the yoke 31 to remain at the same distance with respect to the aperture 34 of the arm 35 so that by the time the rod 10 has reached a fully extended position it will have been moved upwardly to beyond an upright position and will assume a position inclined upwardly and inwardly with respect to the boat 27, as seen in dotted lines (Figure 1) and at the extreme right position of the rod. It will thus be readily apparent that the fish will be raised out of the water and swung over the gunwale 26 to a position over the boat 27 so that when the compressed medium is released from the pole section 11, which can be accomplished by a suitable bleeder valve, not shown, adjacent the source of said medium, the rod 10 will be returned to a retracted, telescoped position by the weight of the fish and which will thus cause the fish to be lowered into the boat. It will thus be readily apparent that the rod 10 eliminates the necessity of using a gaff in boating a large fish and likewise eliminates the need of manually landing the fish which, frequently requires three or four men whereas the fishing rod 10 can be operated by a single man.

It will also be readily apparent that the rod 10 can be used with a line which is slideably connected thereto and attached to a power driven reel or winch within the boat 27 so that a fish could be drawn in close to the boat and thereafter swung aboard by the rod 10. The rod 10 could also be utilized in connection with sport fishing by attaching a gaff to the line 40 and after a fish had been brought to a position to be gaffed, the rod 10 could be utilized as previously described for swinging the gaffed fish into the boat.

It will likewise be readily apparent that the apparatus 10 is equally well adapted to be used as a derrick or boom for lifting and swingably conveying various loads as its use as a fishing rod merely illustrates one class of load adapted to be lifted and conveyed thereby.

Various other modifications and changes are likewise contemplated and may be restorted to, without departing from the spirit or scope of the invention as hereinafter defined by the appended claim.

I claim as my invention:

A hoisting and conveying apparatus comprising an elongated hollow member formed of telescoping tubular sections defining a closed chamber and including an inner section and an outer extensible section, means for pivotally mounting said member adjacent an end of said inner section on a supporting structure, an arm fixed to and projecting from the pivoted end of the member and disposed at an angle thereto and extending in an upward direction when said member is disposed in substantially a horizontal plane, a cable having one end anchored to the supporting structure and its opposite end secured to the outer extensible section, said arm having an eye at its free end through which an intermediate portion of the cable slidably extends, means for connecting a load to be lifted to the outer end of said outer extensible section, and means for supplying a compressed medium to said chamber for extending the outer extensible section of said member and, in cooperation with said cable and arm, for causing the member to be swung upwardly on its pivot to beyond an upright position.

ANTHONY MOLISKEY.

REFERENCES CITED

The following references are of record in the file of this patent:

UNITED STATES PATENTS

| Number | Name | Date |
| --- | --- | --- |
| 72,064 | McDonald | Dec. 10, 1867 |
| 1,019,268 | Melzer | Mar. 5, 1912 |
| 2,244,559 | Lawton | June 3, 1941 |
| 2,446,586 | Harzbaugh | Aug. 10, 1948 |